US006278220B1

(12) United States Patent
Furukoshi et al.

(10) Patent No.: US 6,278,220 B1
(45) Date of Patent: Aug. 21, 2001

(54) ULTRASONIC MOTOR DRIVE APPARATUS HAVING SURGE AND OSCILLATION SUPPRESSING MEMBER

(75) Inventors: Hiroyuki Furukoshi, Toyohashi; Toshihiro Uchida; Teruhisa Matsushita, both of Toyota, all of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/511,682

(22) Filed: Feb. 23, 2000

(30) Foreign Application Priority Data

Jun. 25, 1999 (JP) .................................................. 11-180085

(51) Int. Cl.$^7$ ..................................................... H02N 2/00
(52) U.S. Cl. ......................................................... 310/316.02
(58) Field of Search ........................ 310/316.02, 323.02; 318/116

(56) References Cited

U.S. PATENT DOCUMENTS

| | | | |
|---|---|---|---|
| 4,703,213 | * 10/1987 | GaHerbert | 310/316 |
| 4,868,521 | * 9/1989 | Konrad | 331/1 R |
| 4,939,402 | * 7/1990 | Hirayama et al. | 310/316 |
| 4,965,481 | * 10/1990 | Kashiyama | 310/316 |
| 5,021,700 | * 6/1991 | Takahashi et al. | 310/316 |
| 5,093,606 | * 3/1992 | Adachi et al. | 318/116 |
| 5,140,231 | * 8/1992 | Kashiyama | 318/116 |
| 5,210,454 | * 5/1993 | Naito | 310/316 |
| 5,436,521 | * 7/1995 | Kataoka | 310/317 |
| 5,563,464 | * 10/1996 | Okubu et al. | 310/316 |
| 6,084,363 | * 7/2000 | Mizumoto | 318/316 |

FOREIGN PATENT DOCUMENTS

| | | |
|---|---|---|
| 11-191971 | 7/1999 | (JP) . |
| 11-191978 | 7/1999 | (JP) . |

* cited by examiner

*Primary Examiner*—Nestor Ramirez
*Assistant Examiner*—Peter Medley
(74) *Attorney, Agent, or Firm*—Law Office of David G. Posz

(57) ABSTRACT

An ultrasonic motor drive apparatus includes a transformer having a primary coil and a secondary coil which drives a piezoelectric body of an ultrasonic motor. One end and the other end of the primary coil are connected to the drains of MOSFETS. The gates of the MOSFETs are connected to receive switching signals to alternately turn on and off electrical currents which flow in the primary coil. The sources of the MOSFETs are connected to the ground through ferrite beads, respectively. The ferrite bead generates a counter electromotive voltage so that the surge voltage which develops on the drain of the MOSFET at the time of turning off of the MOSFET is suppressed and high frequency oscillations are suppressed.

10 Claims, 5 Drawing Sheets

ULTRASONIC MOTOR DRIVE APPARATUS HAVING SURGE AND OSCILLATION SUPPRESSING MEMBER

CROSS REFERENCE TO RELATED APPLICATION

This application relates to and incorporates herein by reference Japanese Patent Application No. 11-180085 filed on Jun. 25, 1999.

BACKGROUND OF THE INVENTION

The present invention relates to ultrasonic motor drive apparatuses, and particularly to an ultrasonic motor drive apparatus having a switching-type power source.

Ultrasonic motors use ultrasonic vibrations as the driving force. In a progressive wave-type ultrasonic motor, a stator is comprised of an annular elastic body and a piezoelectric body which are attached to each other, and a rotor fixed to a drive shaft is pressured to contact the stator. The piezoelectric body is supplied with drive signals at a fixed frequency and in two phases, a sine wave and a cosine wave that are 90° different in phase. The piezoelectric body produces mechanical vibrations in response to the two-phase drive signals to cause in the elastic body ultrasonic vibrations (progressive waves) that move in the annular direction along the elastic body. The progressive waves rotate the rotor pressure-contacted with the elastic body. The progressive waves rotates the rotor pressure-contacted with the elastic body.

A drive apparatus which generates the drive signals is comprised of a microcomputer, an oscillator circuit, a switching control circuit, a voltage generator circuit, a drive signal generator circuit, a band pass filter and the like. In the drive apparatus, the voltage generator circuit generates a direct current (d.c.) voltage, and the drive signal generator circuit converts it into an alternating current (a.c.) voltage of a fixed oscillation frequency. The drive apparatus applies the a.c. voltage to the piezoelectric body to drive the ultrasonic motor.

Various circuit configurations are proposed for the drive signal generator circuit and the voltage generator circuit. A switching-type power source circuit is generally known. This circuit uses a transformer having a primary coil and a secondary coil. A switching device such as a metal oxide semiconductor field effect transistor (MOSFET) is connected to the primary coil to which the d.c. voltage is supplied. The MOSFET turns on and off the primary coil in response to a switching signal to causes the secondary coil to generate the a.c. voltage which has a boosted voltage level.

In this type of circuit configuration, a surge voltage is likely to develop at the drain side of the MOSFET as shown at time point C in FIG. 7, or oscillation is likely to occur as shown at time point D in FIG. 7 due to the inductance (L) of the transformer and the capacitance (C) of the MOSFET when the MOSFET is turned off.

The ultrasonic motor is used, for instance, in a tilting device and a telescopic device of a vehicle steering system. In this system, the d.c. voltage of a vehicle battery (about 12 V) is converted to the a.c. voltage (about 200 Vrms).

In this instance, both the ultrasonic motor and the drive apparatus are grounded to a vehicle chassis as the other vehicle electrical apparatuses such as a radio receiver are. The drive apparatus tends to generate radiation noises and an electrical wire connecting the drive apparatus and the ultrasonic motor tends to generate wire transmission noises if the surge voltage develops or the L-C oscillation occurs. Thus, the radio receiver produces noise sounds from its speakers.

It is therefore proposed in JP-A-11-191971 to connect a resistor and a capacitor in series between the gate terminal and the drain terminal of the MOSFET so that the surge voltage is suppressed. However, the surge voltage suppression is reduced, if the gate current is increased to speed up the turning on of the MOSFET.

It is also proposed in JP-A-11-191978 to connect ferrite beads between the drain terminal of the MOSFET and the transformer so that the high frequency oscillation is suppressed. However, the surge voltage cannot be suppressed at the time of turning off the MOSFET because the ferrite beads operate as an inductor. Therefore, the MOSFET is required to have a high rated voltage resulting in a high cost. Further, the MOSFET results in a large size, if it is required to have a high rated voltage and an increased drain current.

SUMMARY OF THE INVENTION

It is therefore an object of the present invention to provide a drive apparatus for ultrasonic motors which suppresses surge voltages and high frequency oscillations.

According to the present invention, a transformer having a primary coil and a secondary coil is provided in an ultrasonic motor drive apparatus. A switching device such as a MOSFET is connected to the primary coil of the transformer through its drain to turn on and off an electrical current supplied to the primary coil thereby generating an a.c. voltage from the secondary coil which drives a piezoelectric body of an ultrasonic motor. The source of the MOSFET is grounded through a suppression member such as a ferrite bead. The ferrite bead generates a counter electromotive voltage when the MOSFET turns off. This voltage slows down the speed of turning off of the MOSFET, thereby suppressing surge voltages that develop on the drain and also suppresses high frequency oscillations.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Figure 1:
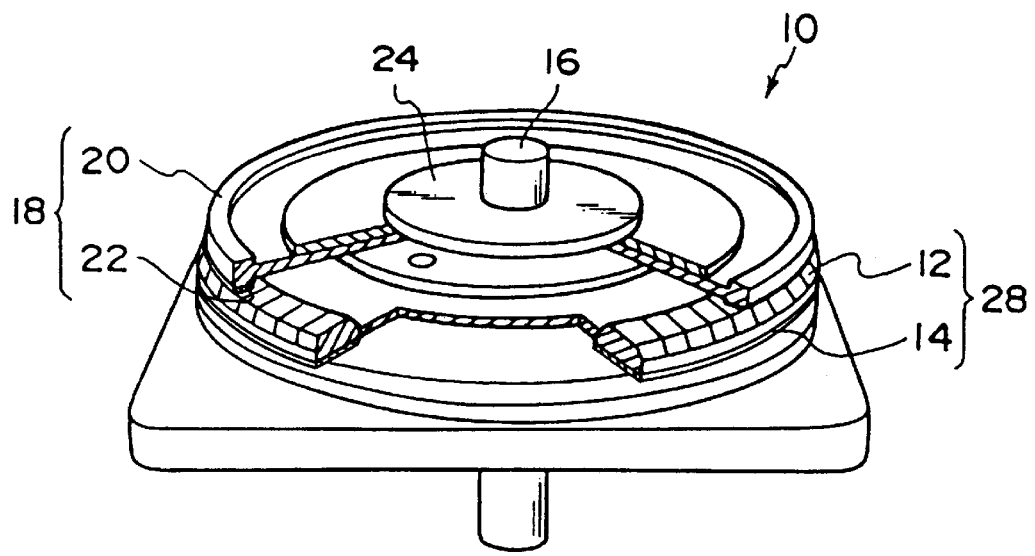
FIG. 1 is a perspective view showing, partially in section, a ultrasonic motor used in an embodiment of the present invention.

Referring first to FIG. 1, a progressive wave-type ultrasonic motor is shown with reference numeral 10. The ultrasonic motor 10 has an annular elastic body 12 made of copper alloy or the like and a piezoelectric body 14 attached to the elastic body 12. The elastic body 12 and the piezoelectric body 14 thus form a stator 28. The piezoelectric body 14 is made of a piezoelectric material that converts an electrical signal to a mechanical signal, and divided into a plurality of segments by a plurality of electrodes.

The ultrasonic motor 10 also has a drive shaft 16 and a rotor 18 fixed to the shaft 16. The rotor 18 is comprised of a rotor ring 20 made of aluminum alloy or the like and an annular slider 22 attached to the rotor ring 20. The slider 22 is pressured to contact the elastic body 12 by a spring 24. The slider 22 is made of engineering plastics or the like to provide a uniform friction force so that the rotor 18 may be rotated in high efficiencies.

Figure 2:
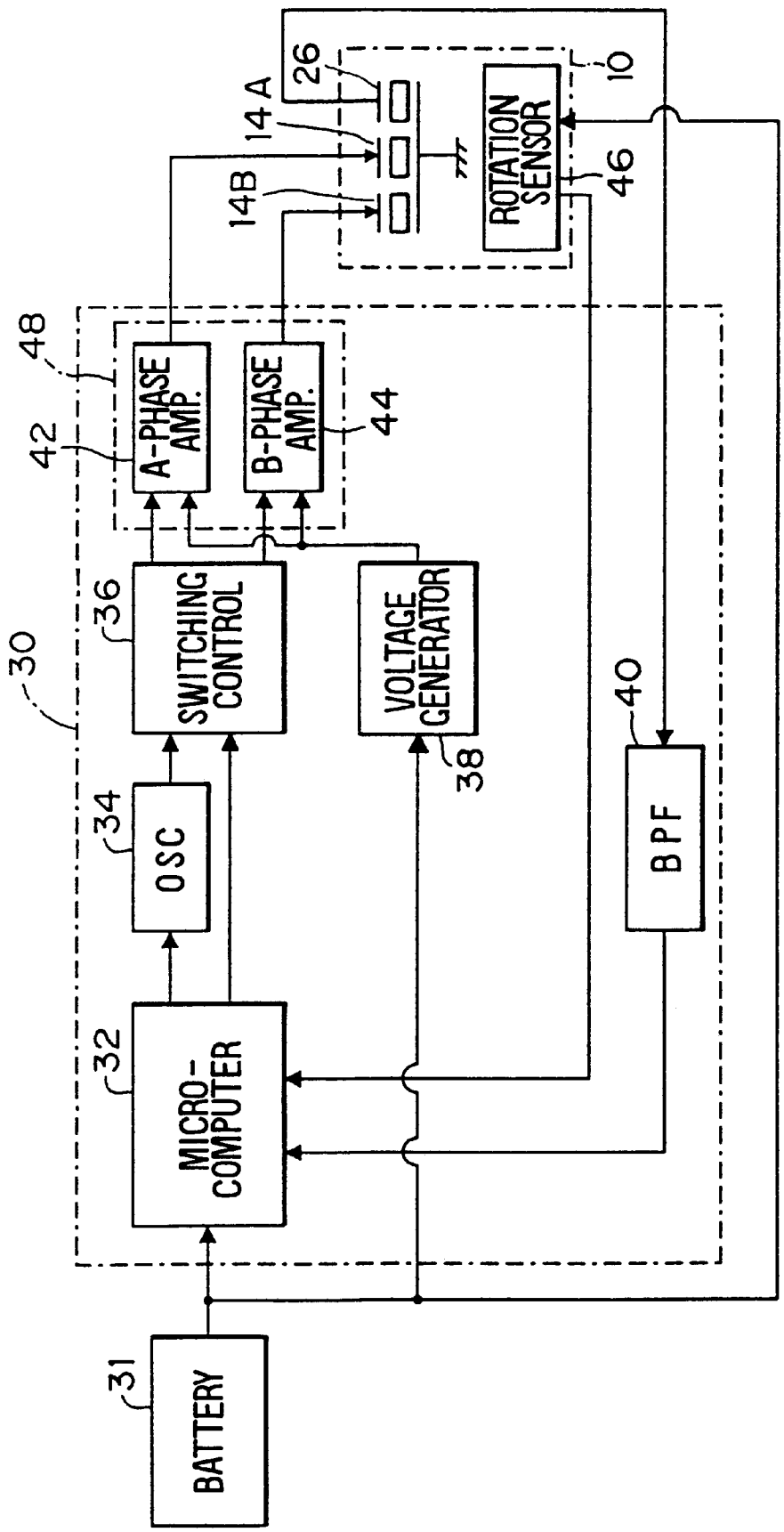
FIG. 2 is a block diagram showing an ultrasonic motor drive apparatus according to the embodiment.

The elastic body 12 is attached with a piezoelectric device 26 as shown in FIG. 2. The piezoelectric device 26 is grounded at one end and connected to the input terminal of a band pass filter 40 of a drive apparatus 30. The piezoelectric device 26 detects vibrations of the elastic body 12 and produces an a.c. signal (vibration feedback signal) which varies its amplitude and frequency with the detected vibrations. The output terminal of the band pass filter 40 is connected to one input terminal of a microcomputer 32. The band pass filter 40 wave-detects the vibration feedback signal produced from the piezoelectric device 26 to apply the same to the microcomputer 32.

The ultrasonic motor 10 has a rotation sensor 46, the output terminal of which is connected to the other input terminal of the microcomputer 32. The rotation sensor 46 is connected to a d.c. power source (battery) 31. The rotation sensor 46 is comprised of a permanent magnet, a Hall device and the like, so that the Hall device detects changes in the magnetic flux passing through the surface of the magnet. The rotation sensor 46 thus applies to the microcomputer 32 a pulse signal which varies its period in accordance with the rotation speed of the rotor 18 during rotation of the rotor 18. The microcomputer 32 calculates the rotation speed of the ultrasonic motor 10.

The microcomputer 32 is connected to the battery 31 to monitor a battery output voltage. The output terminals of the microcomputer 32 are connected to an oscillator circuit 34 and one input terminal of a switching control circuit 36. The oscillator circuit 34 produces an oscillation signal which varies with a drive frequency signal from the microcomputer 32. The output terminal of the oscillator circuit 34 is connected to the other input terminal of the switching control circuit 36.

The switching control circuit 36 is connected to an A-phase amplifier circuit 42 and a B-phase amplifier circuit 44 which jointly constitute a drive signal generator circuit 48. The switching control circuit 36 produces to the amplifier circuits 42 and 44 drive pulses which change at the frequency of the oscillation signal produced from the oscillator circuit 34.

The voltage generator circuit 38 is connected to the A-phase amplifier circuit 42 and the B-phase amplifier circuit 44. The voltage generator circuit 38 converts the d.c. voltage supplied from the battery 31 to a boosted a.c. voltage and produces a boosted d.c. voltage through rectifying and smoothing operation. The boosted d.c. voltage is applied to the amplifier circuits 42 and 44.

Figure 3:
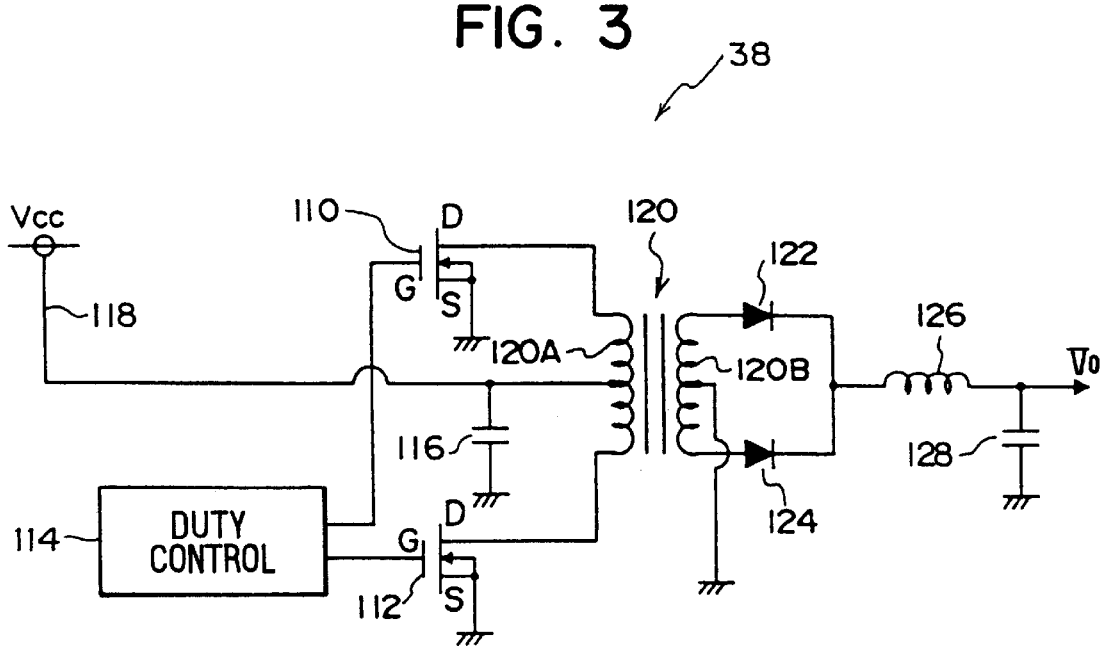
FIG. 3 is an electrical wiring diagram showing a voltage generator circuit used in the embodiment.

The voltage generator circuit 38 has, as shown in FIG. 3, a transformer 120 having a primary coil 120A and a secondary coil 120B. The mid point of the primary coil 120A is connected to the battery 31 (Vcc in FIG. 3) through a power supply wire 118. A capacitor 116 is connected between the power supply wire 118 and the ground.

The primary coil 120A of the transformer 120 is connected to the drain D of a MOSFET 110 at its one end. The gate G of the MOSFET 110 is connected to one output terminal of a duty control circuit 114, and the source S of the MOSFET 110 is grounded. Similarly, the primary coil 120A is connected to the drain D of a MOSFET 112 at its other end. The gate G of the MOSFET 112 is connected to the other output terminal of the duty control circuit 114, and the source S of the MOSFET 112 is grounded.

The secondary coil 120B of the transformer 120 is connected to the anode of a diode 122 at its one end and to the anode of a diode 124 at its other end. The mid point of the secondary coil 120B is grounded. The cathodes of the diodes 122 and 124 are connected to one end of a coil (inductor) 126. The other end of the coil 126 is connected to a capacitor 128 which is grounded. Thus, the boosted d.c. voltage developing across the capacitor 128 is applied to the A-phase amplifier circuit 42 and the B-phase amplifier circuit 44.

Figure 4:
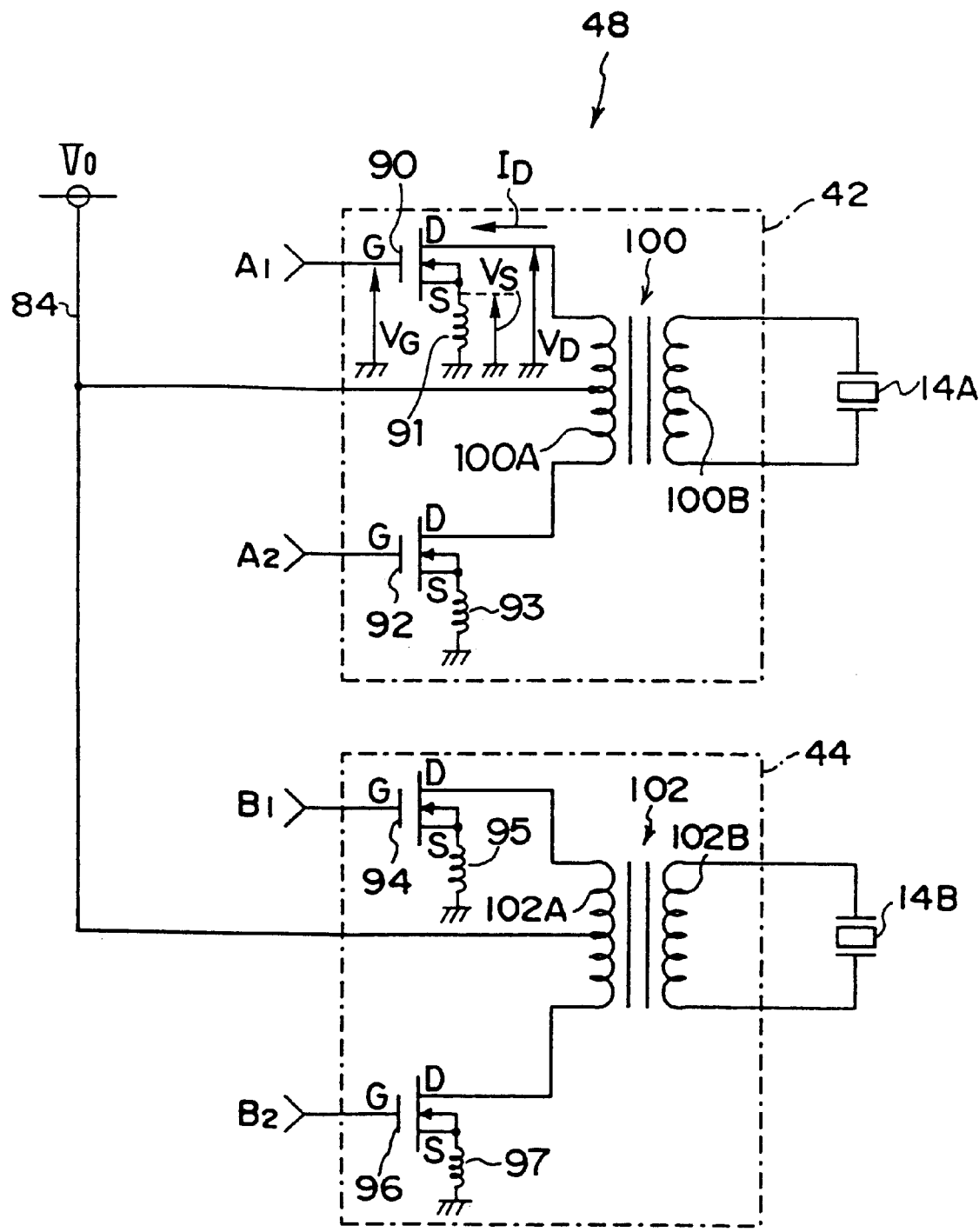
FIG. 4 is an electrical wiring diagram showing a drive signal generator circuit used in the embodiment.

As shown in FIGS. 1 and 4, the A-phase amplifier circuit 42 is connected to a piezoelectric body 14A of the ultrasonic motor 10 to supply the same with a sine wave voltage. The B-phase amplifier circuit 44 is connected to a piezoelectric body 14b of the ultrasonic motor 10 to supply the same with a cosine wave voltage. The two bodies 14A and 14B jointly constitute the piezoelectric body 14. The amplifier circuits 42 and 44 are constructed as shown in FIG. 4.

The A-phase amplifier circuit 42 includes a transformer 100 having a primary coil 100A and a secondary coil 100B. The mid point of the primary coil 100A is connected to the output terminal of the voltage generator circuit 38 through a power supply wire 84 to receive the boosted d.c. voltage Vo. The primary coil 100A is connected at its one end to the drain D of a MOSFET 90, and at its other end to the drain D of a MOSFET 92. The sources S of the MOSFETs 90 and 92 are grounded through ferrite beads 91 and 93, respectively. The secondary coil 100B is connected to the piezoelectric body 14A.

The B-phase amplifier circuit 44 includes a transformer 102 having a primary coil 102A and a secondary coil 102B. The mid point of the primary coil 102A is connected to the output terminal of the voltage generator circuit 38 through the power supply wire 84 to receive the boosted d.c. voltage Vo. The primary coil 102A is connected at its one end to the drain D of a MOSFET 94, and at its other end to the drain D of a MOSFET 96. The sources S of the MOSFETs 94 and 96 are grounded through ferrite beads 95 and 97, respectively. The secondary coil 102B is connected to the piezoelectric body 14B.

The ferrite beads 91, 93, 95 and 97 are used to suppress surge voltages and high frequency oscillations. Each bead comprises a hollow cylindrical ferrite core and attenuates high frequency components (for instance, more than 10 MHz) of a current which flows in an electrical wire passing through the ferrite core. The gates G of the MOSFETs 90, 92, 94 and 96 are connected to the switching control circuit 36 so that the MOSFETs 90, 92, 94 and 96 are turned on and off in response to switching signals A1, A2, B1 and B2 applied from the switching control circuit 36, respectively.

The drive apparatus 30 for the ultrasonic motor 10 operates as follows.

First, the microcomputer 32 produces a drive frequency signal to the oscillator circuit 34 which in turn oscillates at a frequency determined by the microcomputer 32. The voltage generator circuit 38 receives the battery voltage Vcc from the battery 38. The duty control circuit 114 produces the switching signals to the gates G of the MOSFETs 110 and 112 at predetermined timings. As the current to the primary coil 120A of the transformer 120 is alternately turned on and off, the secondary coil 120 responsively generates an a.c. voltage. This a.c. voltage is full-wave rectified by the diodes 122 and 124 and smoothed by the coil 126 and the capacitor 128. The resulting d.c. voltage is supplied to the A-phase amplifier circuit 42 and the B-phase amplifier circuit 44.

Figure 5:
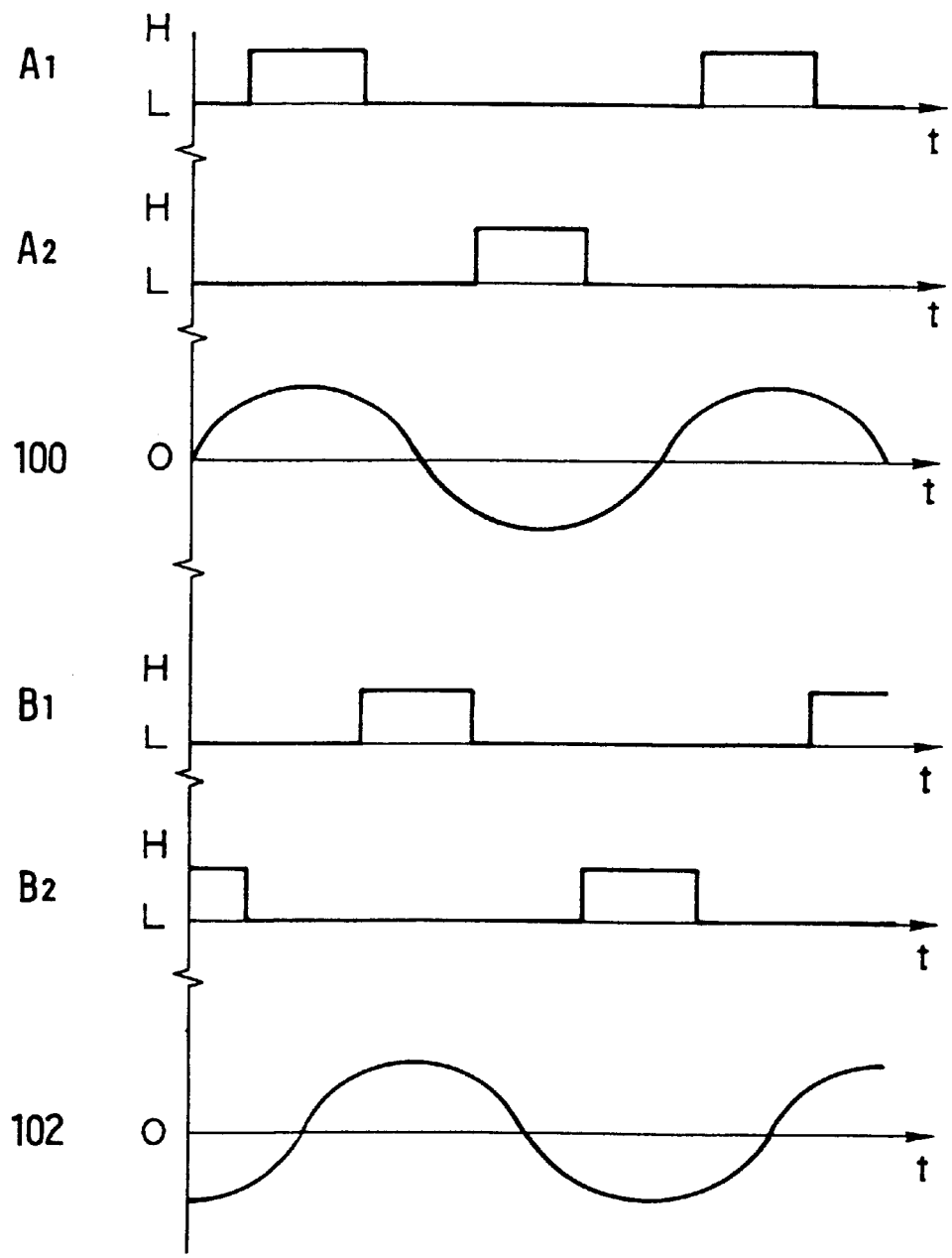
FIG. 5 is a timing diagram showing a switching signal and a drive signal developing from a switching circuit and a transformer used in the embodiment.

The switching control circuit 36 applies the switching signals A1, A2, B1 and B4 to the MOSFETs 90, 92, 94 and 96 in the amplifier circuits 42 and 44 as shown in FIG. 5. Specifically, only one of the switching signals is changed to the high level H to turn on the corresponding MOSFET while the other switching signals are maintained at the low level L. Each switching signal is changed to the high level for a one-fourth period of the frequency Fs of the drive signal. Thus, the MOSFETs 90, 92, 94 and 96 are turned on in sequence at the frequency determined by the microcomputer 32. As a result, the currents to the primary coils 100A and 102A are supplied alternately, and the secondary coils 100B and 102B responsively generates the a.c. voltages as shown in FIG. 5. These a.c. voltages are the same in frequency but different in phase by 90°.

When the a.c. drive voltages are applied to the piezoelectric bodies 14A and 14B of the ultrasonic motor 10, the progressive wave is generated in the elastic body 12 to rotate the rotor 18. The vibrations of the elastic body 12 are converted into the electrical signal by the piezoelectric device 26 and applied to the microcomputer 32 as the feedback signal through the band pass filter 40. The rotation pulse signals produced from the rotation sensor 46 are also applied to the microcomputer 32. The microcomputer 32 responsively controls the timings of turning on and off the MOSFETs 90, 92, 94 and 96 while monitoring the feedback signal so that the motor drive frequency is maintained at an optimum drive frequency.

Figure 6:
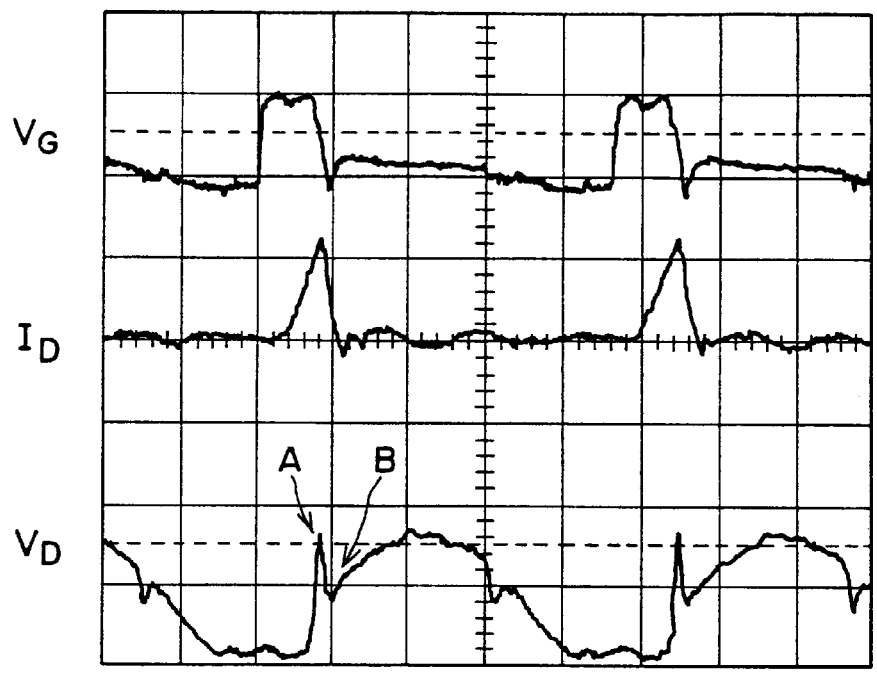
FIG. 6 is a timing diagram showing an operation of a MOSFET used in the embodiment.
Figure 7:
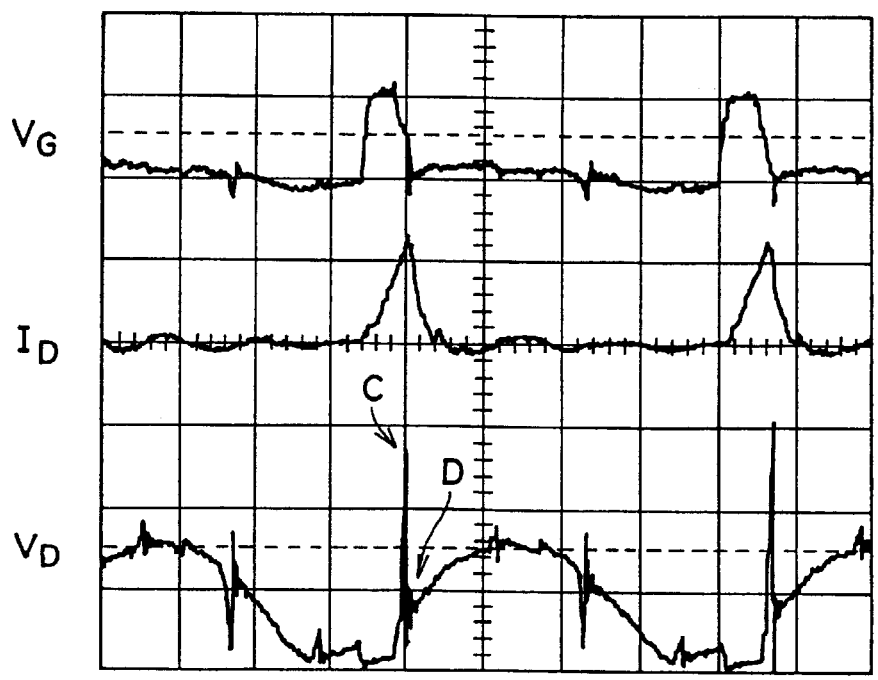
FIG. 7 is a timing diagram showing an operation of a MOSFET used in the conventional ultrasonic motor drive apparatus.

In the above operation, it is assumed that the MOSFET 90 is turned off in response to the signal level change of the drive switching signal A1. As shown in FIG. 6, when the gate voltage $V_G$ changes from 5 volt to 0 volt, and the drain current $I_D$ responsively decreases. At this moment, the ferrite bead 91 operates as the inductor to generate a counter electromotive voltage in response to the decrease in the drain current $I_D$. Thus, the source voltage is changed to a negative voltage.

For this reason, the MOSFET 90 does not turn off instantly but turns off slowly because the gate voltage $V_G$ becomes larger than the source voltage $V_S$. As a result, the surge voltage that develops on the drain voltage $V_D$ is suppressed at time point A as shown in FIG. 6. Further, as shown at time point B, the ferrite bead 91 suppresses the oscillation at high frequencies (more than 10 MHz, for instance) that would occur due to the capacitance of the MOSFET 90 and the inductance of the transformer 100. The MOSFET 90 is turned on faster than in the conventional apparatus in which a resistor and a capacitor are connected in series between the gate and the drain of a MOSFET.

The present invention should not be limited to the disclosed embodiment but may be implemented or applied differently. For instance, the present invention may be applied to the voltage generator circuit 38. Specifically, the sources S of the MOSFETs 110 and 112 may be grounded through ferrite beads.

What is claimed is:

1. An ultrasonic motor drive apparatus comprising:

a d.c. power source;

a transformer having a primary coil and a secondary coil, the primary coil having a first end connected to the power source and a second end;

a switching device having an input terminal, an output terminal and a control terminal, the input terminal being connected to the second end of the primary coil and the output terminal connected to a ground, the switching device being for turning on and off an electrical current to the primary coil in response to a control signal applied to the control terminal; and a suppression member connected between the output terminal of the switching device and the ground to suppress surge voltages and high frequency oscillations.

2. An ultrasonic motor drive apparatus of claim 1, wherein the suppression member is a ferrite bead.

3. An ultrasonic motor drive apparatus of claim 2, wherein the switching device is a MOSFET having a drain connected to the primary coil and a source grounded through the bead.

4. An apparatus for an electric device comprising:

a d.c. power source;

a transformer having a primary coil and a secondary coil, the primary coil having a first end connected to the power source and a second end, and the secondary coil being connected to the electric device;

a switching device connected between the second end of the primary coil and a reference potential, the switching device being for turning on and off an electrical current to the primary coil in response to a control signal applied thereto; and an inductive member connected between the switching device and the reference potential to slow down a turning-off of the switching device thereby to reduce surge voltages.

5. The apparatus of claim 4, wherein the inductive member is a ferrite bead.

6. The apparatus of claim 5, wherein the switching device is a MOSFET having a drain connected to the primary coil and a source grounded through the bead.

7. The apparatus of claim 5, wherein the secondary coil is connected to a piezoelectric device of an ultrasonic motor as the electric device.

8. The apparatus of claim 4, further including a plurality of said switching devices.

9. The apparatus of claim 8, wherein said plurality of switching devices are turned on in sequence at a frequency determined by a microcomputer.

10. The apparatus of claim 9, wherein said microcomputer controls the timings of turning on and off said switching devices in response to the rotation pulse signals and the vibrations of the ultrasonic motor.

* * * * *